United States Patent
Merlin et al.

(10) Patent No.: US 7,953,570 B2
(45) Date of Patent: May 31, 2011

(54) METHOD FOR CONTINUOUS ANALYSIS OF THE TRANSMISSION QUALITY IN FIELDBUS NETWORKS

(75) Inventors: Tilo Merlin, Linsengericht (DE); Peter Ude, Hanau (DE)

(73) Assignee: ABB AG, Mannheim (DE)

( * ) Notice: Subject to any disclaimer, the term of this patent is extended or adjusted under 35 U.S.C. 154(b) by 823 days.

(21) Appl. No.: 11/898,343

(22) Filed: Sep. 11, 2007

(65) Prior Publication Data

US 2008/0065797 A1    Mar. 13, 2008

(30) Foreign Application Priority Data

Sep. 12, 2006    (DE) .......................... 10 2006 042 739

(51) Int. Cl.
*G06F 13/00*    (2006.01)

(52) U.S. Cl. ........ 702/108; 702/183; 702/188; 370/241; 370/242; 370/252; 439/218; 439/924.1; 439/874; 709/245; 709/224; 700/90; 700/100; 375/259; 375/282

(58) Field of Classification Search .................... 702/85, 702/104, 108, 127, 183, 186, 188; 370/241, 370/242, 252, 254, 351; 439/218, 222, 924.1, 439/874; 709/218, 220, 223, 245; 707/999.07; 700/90, 100; 375/259, 282

See application file for complete search history.

(56) References Cited

U.S. PATENT DOCUMENTS

| | | | |
|---|---|---|---|
| 5,712,980 A * | 1/1998 | Beeler et al. | 709/245 |
| 6,959,265 B1 | 10/2005 | Candela et al. | |
| 7,070,433 B2 * | 7/2006 | Joegel et al. | 439/218 |
| 7,173,909 B2 * | 2/2007 | Deuter et al. | 370/242 |
| 7,590,511 B2 * | 9/2009 | Huisenga et al. | 702/183 |
| 2002/0154603 A1 * | 10/2002 | Deuter et al. | 370/241 |
| 2004/0024495 A1 * | 2/2004 | Sunderland | 700/299 |
| 2005/0049727 A1 * | 3/2005 | Tapperson et al. | 700/19 |
| 2006/0253626 A1 * | 11/2006 | Ueno et al. | 710/62 |
| 2006/0259199 A1 * | 11/2006 | Gjerde et al. | 700/284 |
| 2009/0018672 A1 * | 1/2009 | Gienke | 700/1 |

FOREIGN PATENT DOCUMENTS

EP    0 443 061    8/1991

* cited by examiner

Primary Examiner — Carol S Tsai
(74) Attorney, Agent, or Firm — Buchanan Ingersoll & Rooney PC

(57) ABSTRACT

A method is disclosed for continuous analysis of the transmission quality in fieldbus networks in automation systems with a plurality of fieldbus participants, which communicate with one another over the fieldbus network. Directly measurable logical and physical bus parameters are recorded from the line signal transmitted over the fieldbus network, and are stored with a predefinable retrospectivity. Operational parameters are derived from the measured bus parameters, these being weighted and the weighted bus parameters being linked together to form the operational parameter. The quantitative weighting of a bus parameter is functionally determined by at least one other bus parameter.

12 Claims, 2 Drawing Sheets

Figure 1:
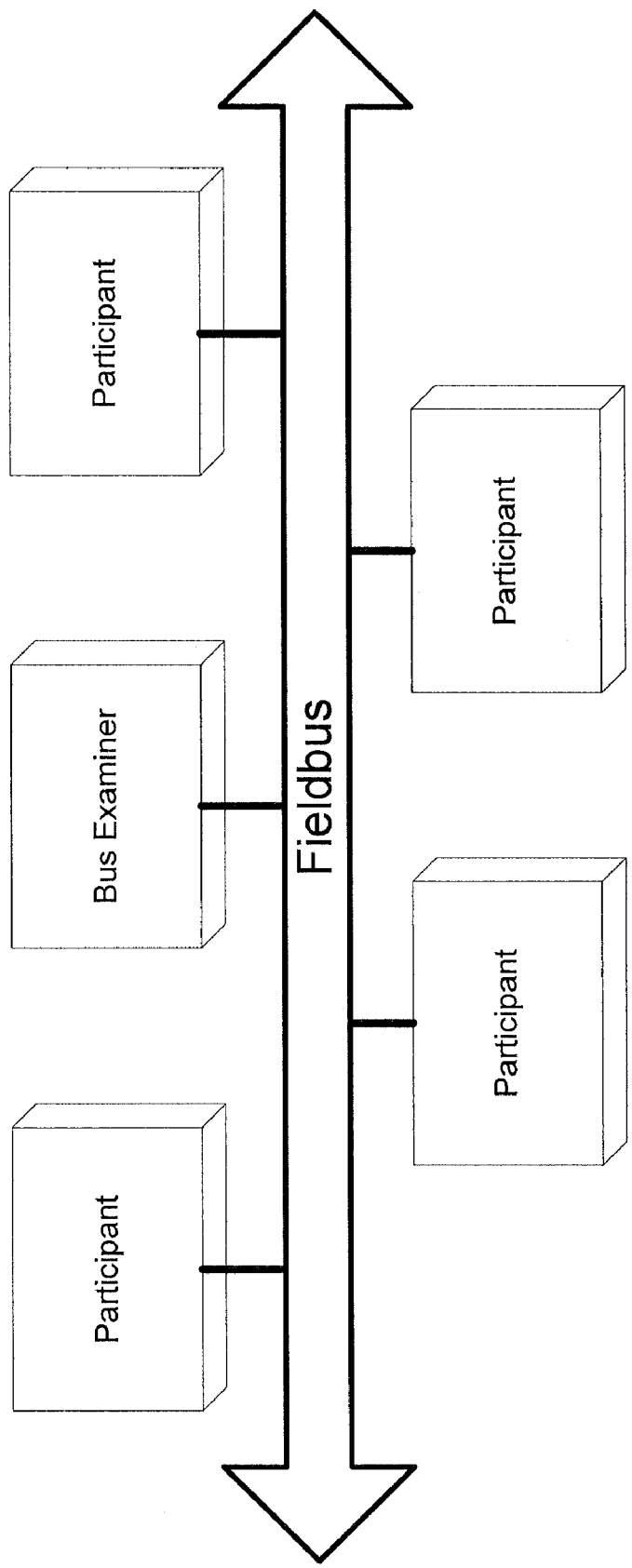

METHOD FOR CONTINUOUS ANALYSIS OF THE TRANSMISSION QUALITY IN FIELDBUS NETWORKS

RELATED APPLICATIONS

This application claims priority under 35 U.S.C. §119 to German Application 10 2006 042 739.4 filed in Germany on Sep. 12, 2006, the entire contents of which are hereby incorporated by reference in their entireties.

FIELD

The disclosure relates to a method for continuous analysis of the transmission quality in fieldbus networks in automation systems.

BACKGROUND

Fieldbuses are routinely used in process industries at field level for data exchange between field devices and a control system. This branch of industry is dominated by Foundation Fieldbus (FF) and PROFIBUS. Both buses are based on the same physical layer according to IEC61158-2.

In practice, several devices sometimes from different manufacturers are operated on one line or section in automation systems. In contrast to the previously predominant 4 . . . 20 mA technology, the planning, installation, startup and maintenance of fieldbus networks makes considerably higher demands on planners, installers and operators. Simple wiring faults like short circuit, wire break or reverses, such as previously occurred because of the high number of signals, are relatively easy to find and correct in fieldbus networks.

Much more critical are the consequences of incorrect layout, faulty installation and lack of monitoring of the operation of the system. Typical faults in the area of planning and layout are manifested in too great lead lengths, too many devices on one line or too weakly rated power supply.

Typical faults in the installation are, for example, lacking or inadequate equipotential bonding, or defects in shielding and grounding of the fieldbus cables.

An added difficulty is that both fieldbus protocols sometimes allow a lot of margin in the interpretation of conditions and parameters, which leads to "creeping" incompatibility between components.

While the aforementioned problems could be avoided by the user, incompatibilities between devices cannot be influenced by the user, nor can he rule them out.

Backup mechanisms in the protocols, such as data reconstruction or message repetition, will suppress most of the faults mentioned above and make them invisible for the user. In most cases, the system will begin operation after numerous corrections, without the operator knowing about the actual transmission quality and thus without guaranteed reliability. The faults normally increase with time, defects in planning and initial installation becoming visible especially in the event of installation extensions. However, these tend to be associated with the extension, as the system was not attracting attention previously.

If nothing odd occurs during startup, measurements are regularly dispensed with and the user relies on the fault tolerance of the devices. In the best case, the startup is monitored with a mobile bus monitor, and control is only transferred once the statistics are satisfactory. The measurements are limited in time and are performed by specialists.

Based on empirical knowledge, systems are planned generously, i.e. with considerable reserve, and the existing potential is thus far from exhausted. The networks are correspondingly complex.

As a result of the lack of continuous information about the transmission quality, the network is only analyzed when faults are detected, without planning. If the system is expanded, new networks are installed in order not to put existing functions at risk, as there is no sound information about the reserve in the network.

SUMMARY

The disclosure is therefore based on the object of determining the transmission quality in fieldbus networks.

The disclosure is based on a fieldbus network with a plurality of fieldbus participants, which communicate with one another over the fieldbus network.

The disclosure is further based on the practical knowledge that the transmission quality in a fieldbus network is influenced by many parameters.

According to the disclosure, directly measurable logical and physical bus parameters are recorded from the line signal transmitted over the fieldbus network, and are stored with a predefinable retrospectivity. Operational parameters are derived from the measured bus parameters, these being weighted and the weighted bus parameters being linked together to form operational parameters. The quantitative weighting of a bus parameter is functionally determined dynamically by at least one other bus parameter. The functional dependency between the weight of a bus parameter and the quantity of other bus parameters expressly includes mathematical correlations of any degree of complexity.

As a result of the continuous recording and assessment of the communication, its logical faults and its signal quality, the transmission quality in the examined fieldbus network is permanently determined. Advantageously, by the inclusion of logical and physical parameters a high quality is achieved for the transmission quality that is determined.

It is further advantageous that the disclosure can be implemented in a physical version, which can be approved for the potentially explosive area of an industrial system. Measurements close to the terminal equipment are thus possible.

According to a further exemplary feature of the disclosure, further operational parameters are formed from the operational parameters by weighted linking with at least one further operational parameter and/or at least one further bus parameter. The multi-stage processing of the influencing variables advantageously permits simple computing steps with greater transparency in the determination of the operational parameters.

According to a further exemplary feature of the disclosure, at least one operational parameter is determined from the bus parameters by a fuzzy method. By means of this feature the transmission quality in fieldbus networks is advantageously determined in a rapid manner.

According to a further exemplary feature of the disclosure, the operational parameters which are determined are recorded. The transmission quality is documented beyond the statement on the transmission quality in the observed fieldbus network. In this way, the state of the network can be adduced to its operator after installation or maintenance.

Figure 2:
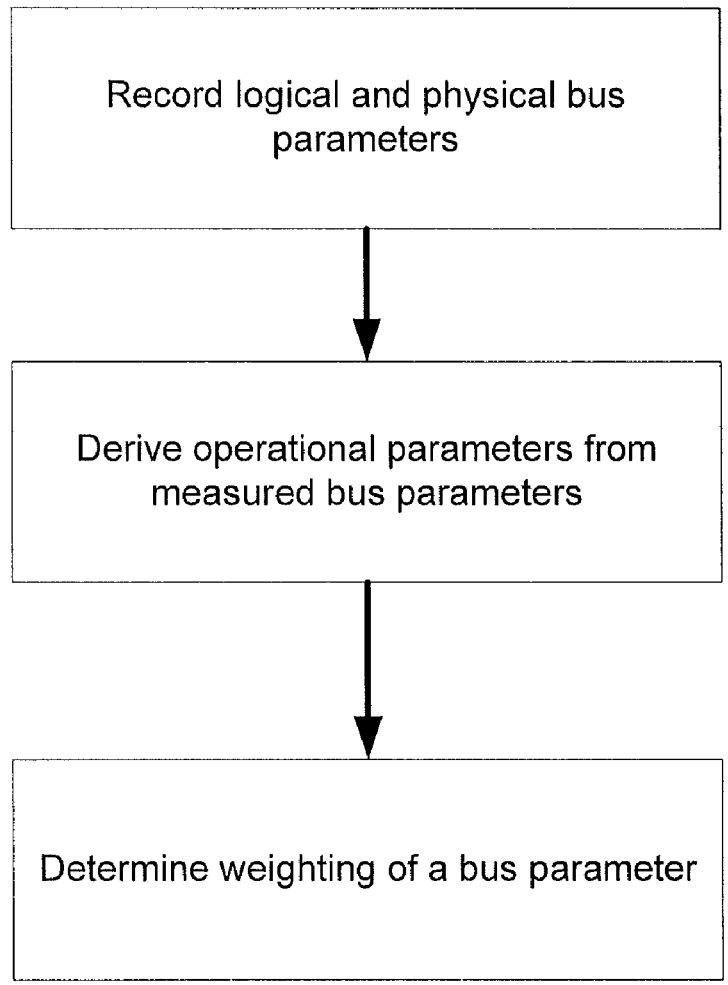

The invention will be further described in detail with reference to the drawings wherein:

FIG. 1 illustrates a fieldbus network in accordance with an exemplary embodiment; and FIG. 2 illustrates a method of analyzing transmission quality in accordance with an exemplary embodiment.

DETAILED DESCRIPTION

The disclosure will be further described in detail with reference to exemplary embodiments.

FIG. 1 illustrates a fieldbus network in accordance with an exemplary embodiment.

Starting from an exemplary fieldbus network in an automation system with a plurality of fieldbus participants, which communicate with one another over the fieldbus network, directly measurable logical and physical bus parameters are continuously recorded from the line signal transmitted over the fieldbus network, and are stored with a predefinable retrospectivity. These include in detail but not exhaustively:

DC Component

The fieldbus signal is electrically recorded, and firstly its DC component determined. The DC component is further processed with statistical methods, and the limit values and mean value are determined in this way. The limit values are laid down by the fieldbus standards, and the voltage is accordingly mapped onto a preset value range.

Voltage Fluctuation

The standard deviation of the instantaneous value from the mean value along with the time position of minimum and maximum and their amplitude difference produce a further bus parameter and are similarly mapped onto a defined value range.

Mean Value of the Useful Signal Amplitude

The level of the useful signal amplitude is significant for the robustness of the communication. The measured value is mapped onto a defined value range, the fieldbus standard serving as scaling values.

Variance of the Useful Signal Amplitude

Strong dispersion of the useful signal amplitude can lead to an overall good rating in the mean value, although frequent faults can be expected of the "weaker", possibly more distant participants. The variance of the individual amplitudes, i.e. the difference from strong to weak message frames, is therefore similarly mapped as a bus parameter onto a value range.

Jitter

Jitter of the communication signal, i.e. the time fluctuation of zero crossings or edges, is a significant cause of faults in the fieldbus network. Jitter arises from an asymmetric offset, not constant in time, on the two lines of the network. Reasons for this can be for example parasitic capacitances of the lines to the common screen. An electric noise pulse, which affects both lines to the screen (ground), is weakened to different degrees by the different parasitic capacitances on both lines, resulting in a shift of the zero line. Because of the trapezoidal form of the useful signal in practice, a time shift of the zero crossing results.

Asymmetry of the Useful Signal

A quasi static zero offset of the useful signal is likewise recorded as a bus parameter.

Bus Idle Times

If the fieldbus communication contains a high pause content, a large reserve must be assumed for one thing, and further, from a statistical angle a malfunction will also occur in a pause, and not lead to an error, as no frame is destroyed.

Average Message Frame Length

In unreliable communication the probability is higher that a long frame is destroyed than a shorter. Furthermore, the time influence on a complete cycle is lower if a short frame is repeated than a long one. For this reason, the average message frame length is measured. With all other parameters equal, a high value leads to a poorer rating than a low value.

Number of Participants

The more participants that are interconnected in a network, the greater is the probability of a fault. This is partly because of the physical properties such as alternating current load or asymmetries, and also because of the increasing probability of potential incompatibilities between the devices. The number of detected participants is thus an important bus parameter for forming the primary information.

Message Frame Faults

The term 'message frame fault' is used for a series of individual faults. It is common to all that the recipient cannot decode the data. Possible individual faults are for example missing or additional edges in the signal, incorrect checksum, unexpected length, unexpected address or type.

Repeated Message Frames

Depending on the bus protocol, a transmitter can find out whether its sent message has reached the recipient, or has been correctly decoded there. Frequent frame repeats are a clear characteristic of low transmission quality. It can happen here that the local recipient group can correctly decode a received frame, but the addressed participant cannot, or conversely the local recipients classify the frame as faulty while the addressed participant does not. Both cases can be recognized when the frame repeats are observed.

FIG. 2 illustrates a method of analyzing transmission quality in accordance with an exemplary embodiment. As discussed above, logical and physical bus parameters are continuously recorded from the line signal transmitted over the fieldbus between fieldbus participants.

The operational parameters are determined by weighted linking of bus parameters. The quality of the bus parameters is decisively influenced by the implemented expert knowledge. This is expressed in the linked bus parameters and the amount of weightings. As operational parameters, the transmission quality and a reserve are cyclically determined. Within the scope of this disclosure, the term reserve is understood as a measure by which the transmission quality can still sink while the communication is maintained.

The linking of the bus parameters to the operational parameters is preferably multi-stage. First, intermediate values are formed from combinations of bus parameters. It is taken into account here that the significance and thus the weighting of a characteristic is dependent on other characteristics.

In an actual development of the disclosure, it can be provided that to determine the transmission quality from the set specified above, the following parameters are measured:

Parameter a: DC component
Parameter b: Frame repeat rate
Parameter c: Edge slope
Parameter d: Number of participants All values are first scaled to a uniform value range 0 . . . 100. The scaling is parameter-specific and can be linear or non-linear. Thus the number of participants in the range 0 . . . 10 participants is mapped linearly onto a target range of 100 . . . 0, and more than 10 participants also lead to the target value 0. For all standardized operational parameters: 0 is the poorest value, 100 is the best possible value.

A transmission quality X is determined from the standardized operational parameters by weighted summation:

$$X = A*a + B*b + C*c + D*d \tag{1}$$

where, for the weighting coefficients A, B, C and D:

$$A + B + C + D = 1. \tag{2}$$

While a lower edge slope c is expected for a large number of participants d, a higher edge slope c is expected for the same transmission quality X with a lower number of participants d. Accordingly, the expected edge slope c' is a function of the participant numbers d, c'=f(d). This dependency is expressed in the weighting coefficients A, B, C and D for the determination of the transmission quality X. The influence of the edge slope c on the transmission quality X is rated higher for a lower number of participants d, in that a higher value is dynamically assigned to the weighting coefficient C. Consequently, the weighting coefficient C is a function of the number of participants d, C=f(d) where C~d.

From equation (2), the weighting coefficients A, B and D are also a function of the number of participants d, where at least the sum of the weighting coefficients A, B and D falls with increasing participant numbers d, A+B+D~1/d.

As well as strictly analytical or statistical methods, fuzzy-based algorithms can be used. Thus according to a fuzzy-based algorithm the transmission quality would be classed as low if the DC component is "low" and the number of message frame repetitions is "high". According to an analytical method, the transmission quality would be classed as low if the DC component is <10V and the number of message frame repetitions is >50%. After the analytical determination by the calculation guidelines, the quantitative result is converted into quality grades.

After a statistical method for the same purpose, the currently determined bus parameters are individually compared with stored long-term mean values, and if the deviation of one or more parameters is marked, the transmission quality is falling. The fall over time can be used for predictive failure detection.

Adaptive interventions in the weighting can also be implemented. These can be set up manually or automatically. If predominantly robust and fault-tolerant devices are used in a network, then even in unfavorable conditions such as low voltage or asymmetric useful signals, message frame repetitions will only rarely occur. Since these are also recorded, the reserve for this network is specified higher.

In order to use the system without extensive parameterization, the specific characteristics of the network can be automatically determined during a learning phase. In this, all parameters are cyclically stored, possibly by averaging. After completion of the learning phase, the instantaneous values are compared with the learned ones. From the comparison result, the degree of change and the trend is determined, whether and how the properties of the system have changed. In this way it is possible to record by simple means the success of a change to the system. In particular, the behavior of the system after installation work can be judged.

All in all, both at startup and during operation the user obtains a statement about the transmission quality of the communication and hence about the reliability of his fieldbus network. Problems can be detected and analyzed in good time, before individual devices sporadically fail. The secondary information allows sources of error to be localized more quickly. This means that bursts at certain times or for certain participants or sub-networks can be identified.

The disclosure can be implemented in a physical version as a single-chip computer, which can be mounted at any suitable point in the network. The installation can be permanent or temporary.

In an alternative exemplary embodiment, it can be provided that the features of the disclosure are implemented as part of a previously existing device. In particular but not exhaustively, segment couplers or linking devices are seen as suitable for this. From a distributed arrangement of a plurality of facilities executed according to the disclosure in a network, a still better diagnosis of the state of the network is achieved by linking the separate data.

Faults in the network can thus be locally traced. A weak transmitter that leads to faults with many receivers can be detected by linking information from distributed detectors, as can a weak receiver that classifies a marked proportion of message frames as faulty.

The actual diagnosis is formed by linking both physical and logical properties of the communication.

For precise analysis and fault detection, secondary information such as error bursts (related to time or devices) and statistics for individual events are available (e.g. specific events such as participant failure, new parameterization etc. with time stamp).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for continuous analysis of transmission quality in a fieldbus network having a bus examiner and a plurality of participants communicate with one another over the fieldbus network, the bus examiner executing the method comprising:
    measuring at least one of logical and physical bus parameters from signals transmitted between at least two of the plurality of participants over the fieldbus network;
    storing the measured bus parameters; and
    deriving first operational parameters from the measured bus parameters,
    wherein each first operational parameter is formed by linking at least two of the weighted bus parameters, and
    wherein the weighting of a first bus parameter of the measured bus parameters is determined by at least one other measured bus parameter.

2. The method as claimed in claim 1, comprising:
    forming second operational parameters are formed from the first operational parameters by at least one of a weighted linking with at least one first operational parameter and a weighted linking with at least one further bus parameter.

3. The method as claimed in claim 1,
    wherein at least one of the first operational parameters is determined from the measured bus parameters by a fuzzy method.

4. The method as claimed in claim 1,
    wherein the weighting associated with a bus parameter is determined by means of a statistical method from a time series of the bus parameter.

5. The method as claimed in claim 1,
    wherein the bus parameter to be weighted is determined by means of a statistical method from a time series of the bus parameter.

6. The method as claimed in claim 1,
    wherein the first operational parameters are recorded.

7. The method as claimed in claim 6,
    wherein the first operational parameters are recorded as a time series.

8. The method as claimed in claim 2,
    wherein at least one first operational parameter is determined from the bus parameters by a fuzzy method.

9. The method as claimed in claim 3, comprising:
determining a measured bus parameter to be weighted through a statistical method from a time series of the measured bus parameter.

10. The method as claimed in claims 3,
wherein a bus parameter to be weighted is determined by means of a statistical method from a time series of the bus parameter.

11. The method as claimed in claim 5,
wherein first and second the operational parameters which are determined are recorded.

12. A method for continuous analysis of a transmission quality over a fieldbus network having a bus examiner and plural fieldbus participants, the bus examiner executing the method comprising:

measuring logical and physical bus parameters from a line signal transmitted between at least two fieldbus participants over the fieldbus network, and storing the measured parameters, weighting a plurality of the measured bus parameters;

deriving operational parameters from the measured bus parameters based on at least one of the weighted bus parameters, the weighted bus parameters being linked together to form each operational parameter, and determining a weighting of a first bus parameter of the measured bus parameters by at least one other measured bus parameter.

* * * * *